US00RE37520E

(19) United States
(12) Reissued Patent
Williamson

(10) Patent Number: US RE37,520 E
(45) Date of Reissued Patent: Jan. 22, 2002

(54) GRAY CAST IRON SYSTEM FOR SCROLL MACHINES

(75) Inventor: Warren G. Williamson, Sidney, OH (US)

(73) Assignee: Copeland Corporation, Sidney, OH (US)

(21) Appl. No.: 09/585,153

(22) Filed: Jun. 1, 2000

Related U.S. Patent Documents

Reissue of:
(64) Patent No.: 5,759,298
Issued: Jun. 2, 1998
Appl. No.: 08/708,792
Filed: Sep. 9, 1996

U.S. Applications:
(

(63) Continuation of application No. 08/403,455, filed on Mar. 14, 1995, now Pat. No. 5,580,401.

(51) Int. Cl.[7] ..... C22C 37/00
(52) U.S. Cl. ..... 148/321; 420/13; 418/55.2
(58) Field of Search ..... 148/321, 543, 148/545; 420/13, 25, 30; 418/55.2

(56) References Cited

U.S. PATENT DOCUMENTS 4,666,516 A 5/1987 Hornung et al.
5,125,810 A 6/1992 Suefuji et al.
5,277,562 A 1/1994 Fukuhara et al.
5,342,184 A 8/1994 Comparin et al.
5,368,446 A 11/1994 Rode
5,370,513 A 12/1994 Fain
5,388,973 A 2/1995 Richardson, Jr.

FOREIGN PATENT DOCUMENTS

RU 739125 6/1980

OTHER PUBLICATIONS

D.B. Craig, M.J. Hornung, and T.K. McCluhan, Elkem Metals Company, "Gray Iron", pp. 629–646, Metals Handbook, 9th Ed., vol. 15, Castings (1988).

Metals Handbook, 9th Ed., vol. 15, Compacted Graphite Irons, pp. 668–677 (1988).

Apr. 14, 1999, DIRATS Laboratories metallurgical analysis of a compressor scroll produced for a third party purportedly prior to filing date.

*Primary Examiner*—Deborah Yee
(74) *Attorney, Agent, or Firm*—Harness, Dickey & Pierce, P.L.C.

(57) ABSTRACT

A system for making a gray cast iron scrolls using a high performance inoculant.

103 Claims, 4 Drawing Sheets

GRAY CAST IRON SYSTEM FOR SCROLL MACHINES

Matter enclosed in heavy brackets [ ] appears in the original patent but forms no part of this reissue specification; matter printed in italics indicates the additions made by reissue.

This is a continuation of U.S. patent application Ser. No. 08/403,455, filed Mar. 14, 1995, now U.S. Pat. No. 5,580,401.

TECHNICAL FIELD

The present invention relates to an improved cast iron material, and more particularly to an improved gray cast iron system for scroll machines.

BACKGROUND AND SUMMARY OF THE INVENTION

Scroll machines are widely employed in various applications. Recent examples of scroll machines for fluid compression or expansion, without limitation, are addressed in recent U.S. Pat. Nos. 5,342,184, 5,368,446 and 5,370,513, hereby expressly incorporated by reference. In general, scrolls employed in scroll machines may be of a variety of different types. Examples of scroll types include, without limitation, rotating, orbiting and fixed types. Ordinarily at least two scrolls are used, in co-acting combination with each other, in a scroll machine. At least one of the scrolls is a metallic structure having intricate geometries. For instance, typical scroll structures incorporate a plurality of adjoining sections having relatively large section thickness differentials or gradients relative to each other. In service, these scrolls often times encounter strenuous working conditions, and thereby desirably employ materials that will exhibit excellent wear resistance and strengths on the order of 250 MPa or greater. In view of the complexities of shape, and taking into account other material property and processibility requirements, it has been common to manufacture scrolls by casting the scrolls with a cast iron material.

The use of presently available casting materials has presented limitations in improving the design of scrolls and in designing cost effective procedures for the manufacture of scrolls. By way of example, the trend has been toward reducing time consuming machining operations, such as by seeking to reduce finish stock allowances to less than about several millimeters, while at the same time reducing section thicknesses and optimizing the material strengths. The efficient manufacture of sound castings having these desired characteristics has been difficult to achieve using existing materials and systems, especially in castings having smaller section thickness (e.g., thicknesses as low as about four millimeters), because of the resulting nonuniform formation of undesirable microstructures. Absent additional expensive, time consuming and potentially inefficient heat treatments or finishing steps (e.g., to clean up or remove undesired undercooled graphite formations in the microstructure), significant volumes of high integrity scroll castings are often not obtainable over short periods of time.

An example of a popularly employed cast iron material that has been employed for scroll compressors in relatively recent years is a gray iron having a composition as disclosed herein, but absent any high performance inoculant (as defined herein). This material, however, suffers one or more of the above discussed disadvantages, particularly the presence of undesirable amounts of undercooled structure in thin sections. Accordingly, even though sound castings are achieved, the manufacture of high integrity scrolls require expensive and substantial time consuming post-casting finishing steps. Gray iron is addressed in Metals Handbook, 9th. Ed., Vol. 15, pp 629–646, hereby expressly incorporated by reference.

Accordingly, what is needed is a system that permits casting of an intricately shaped article, particularly a scroll, and which will have a tensile strength in excess of 250 MPa, and excellent machinability and wear resistance characteristics. The system should result in an as-cast article requiring no post casting heat treatment, but still providing a substantially homogeneous microstructure having, throughout, a matrix of medium and coarse pearlite and being substantially free of steadite or having steadite present in controlled amounts. The microstructure should also include a generally uniform dispersion of relatively fine type A graphite flakes, and should be attainable regardless of section thickness (e.g., regardless of whether the section thickness exceeds common thicknesses on the order of about 30 mm or is less than about 4 mm). Any resulting undercooled structure (e.g., such as that potentially encountered at vane tips) should exhibit excellent machinability to permit rapid and easy removal of such structure while maximizing as-cast yield, and reducing post-casting finishing inefficiencies. The material should permit the efficient manufacture of scrolls having substantially thinner section thicknesses than previously. For example, high integrity as-cast section thicknesses (e.g., without limitation, for a vane) of as low as about four millimeters should be possible.

The present invention satisfies the above by providing an improved system for making a gray cast iron article, particularly a cast scroll. Other advantages and objects of the present invention will become apparent to those skilled in the art from the subsequent detailed description, the drawings and appended claims.

BRIEF DESCRIPTION OF THE DRAWINGS

The various advantages of the present invention will become apparent to one skilled in the art by reading the following specification and subjoined claims and by referencing the following drawings in which:

DETAILED DESCRIPTION OF THE PREFERRED EMBODIMENTS

While the material and system of present invention may be suitable for the manufacture of many different articles, for exemplary purposes it will be described herein for the manufacture of a scroll machine, and more particularly, a scroll compressor.

Figure 1:
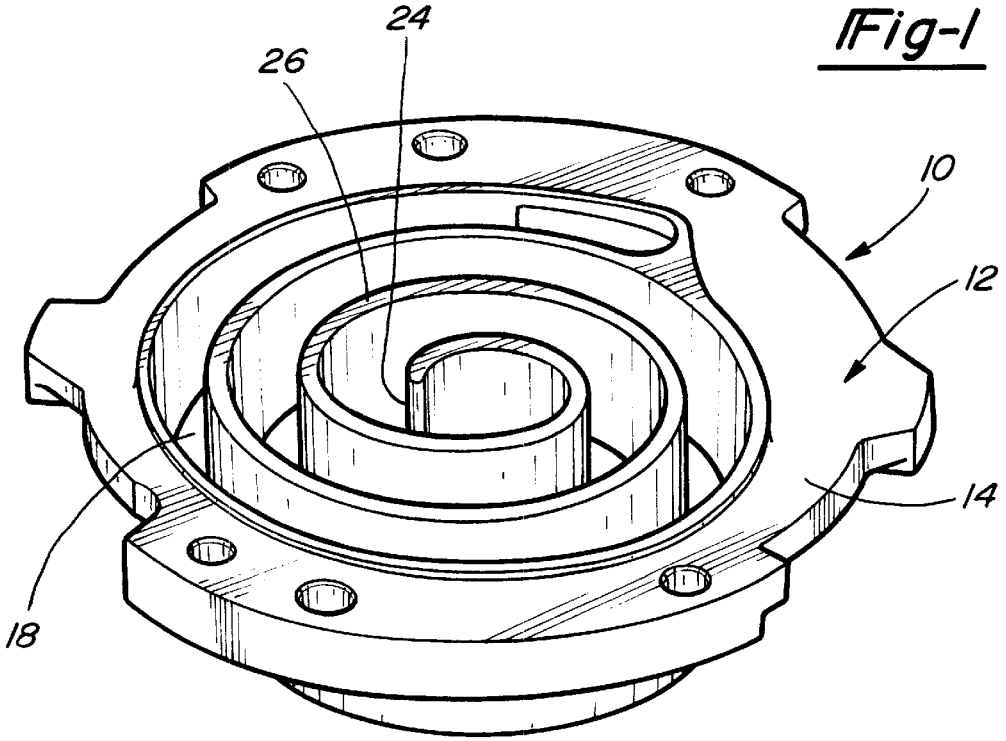
FIG. 1 is a perspective view of a fixed scroll.
Figure 2:
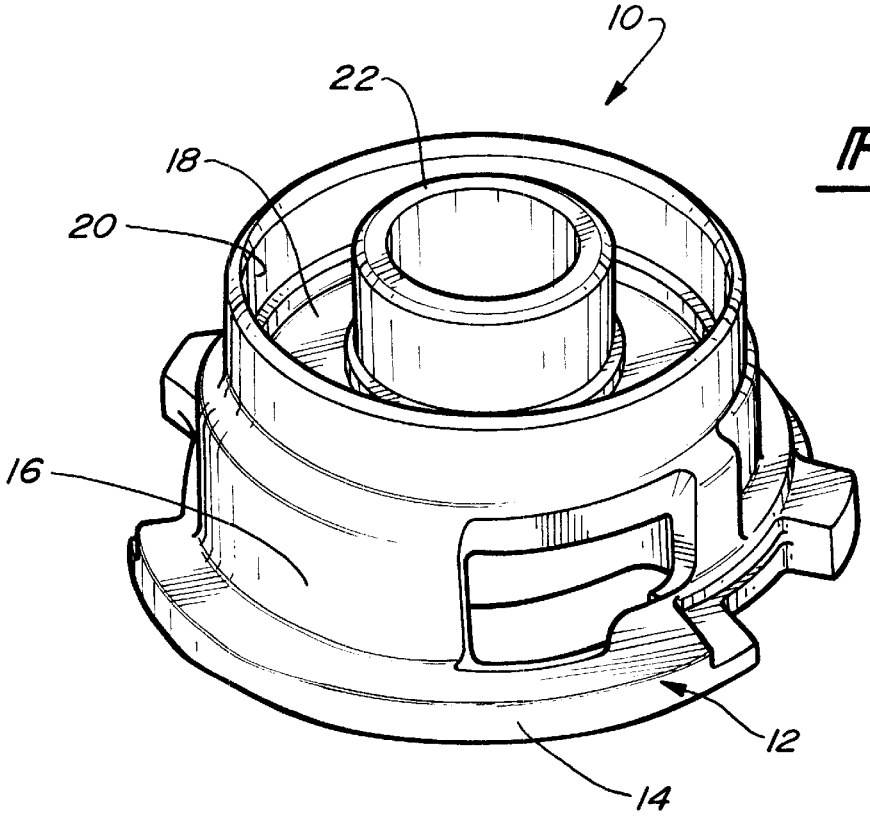
FIG. 2 is another perspective view of the fixed scroll from FIG. 1.
Figure 3:
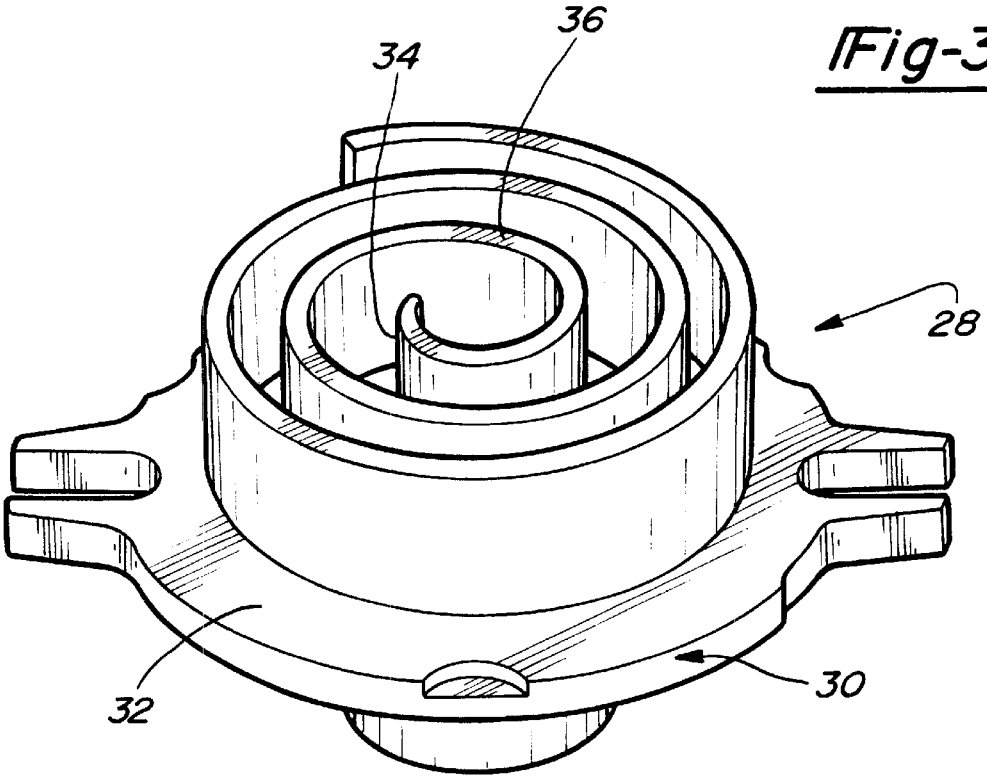
FIG. 3 is a perspective view of an orbiting scroll.
Figure 4:
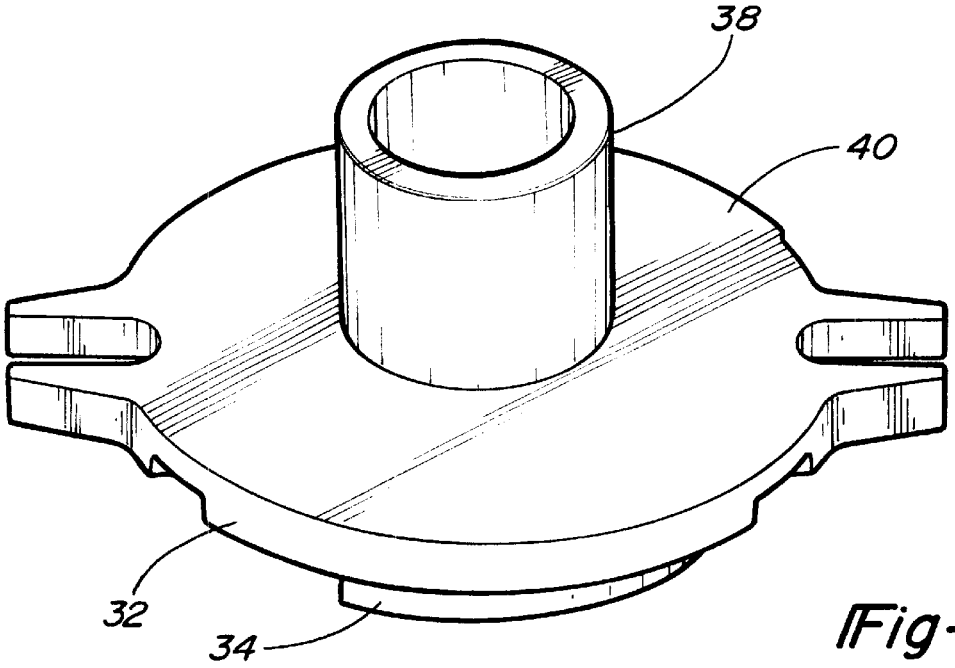
FIG. 4 is another perspective view of the orbiting scroll from FIG. 3.
Figure 5A:
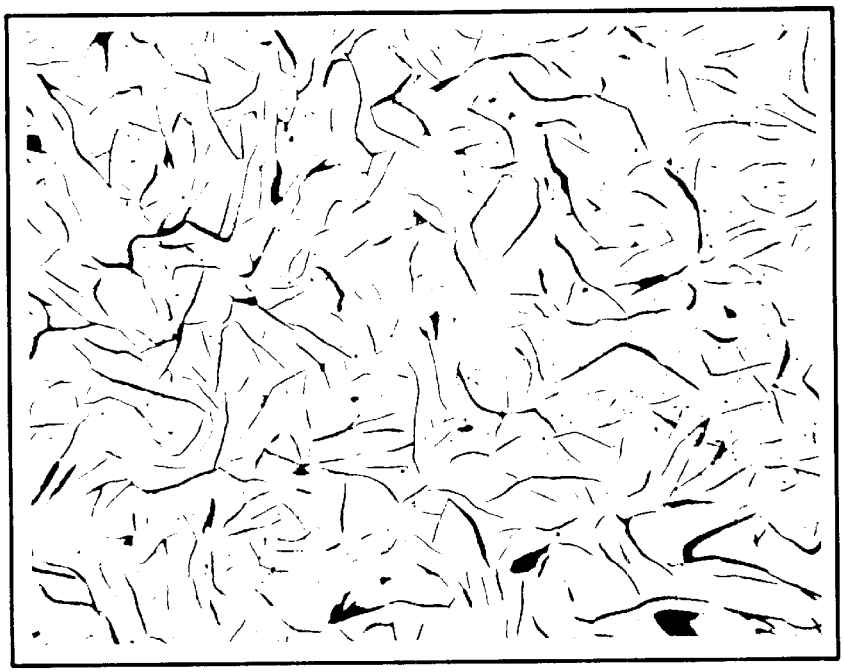
FIG. 5A is a photomicrograph depicting a microstructure of a section (at a magnification of 100×; no etch) of a scroll base portion of the present invention.
Figure 5B:
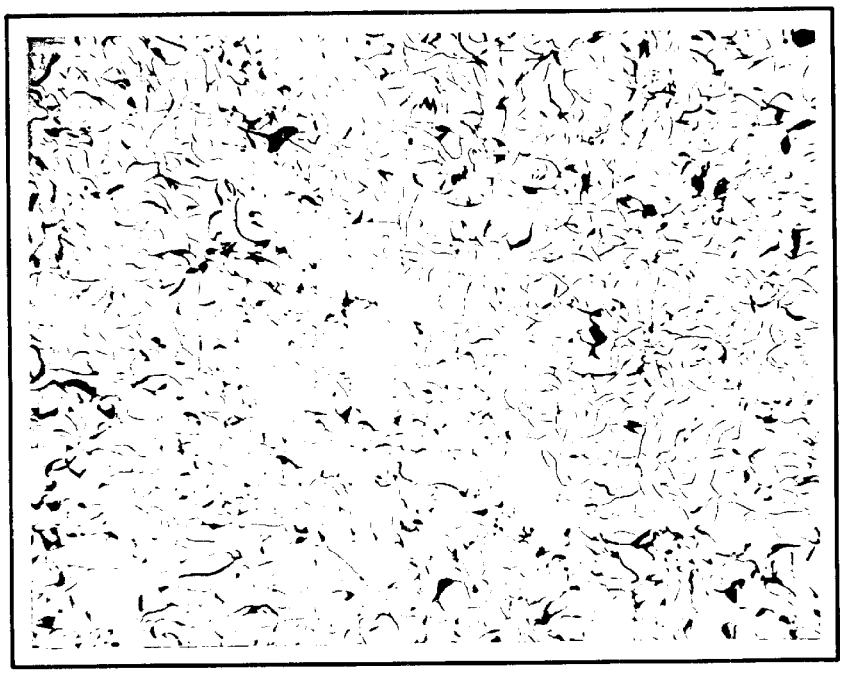
FIG. 5B is a photomicrograph depicting a microstructure of a section (at a magnification of 100×; no etch) of a scroll vane portion of the present invention.
Figure 5C:
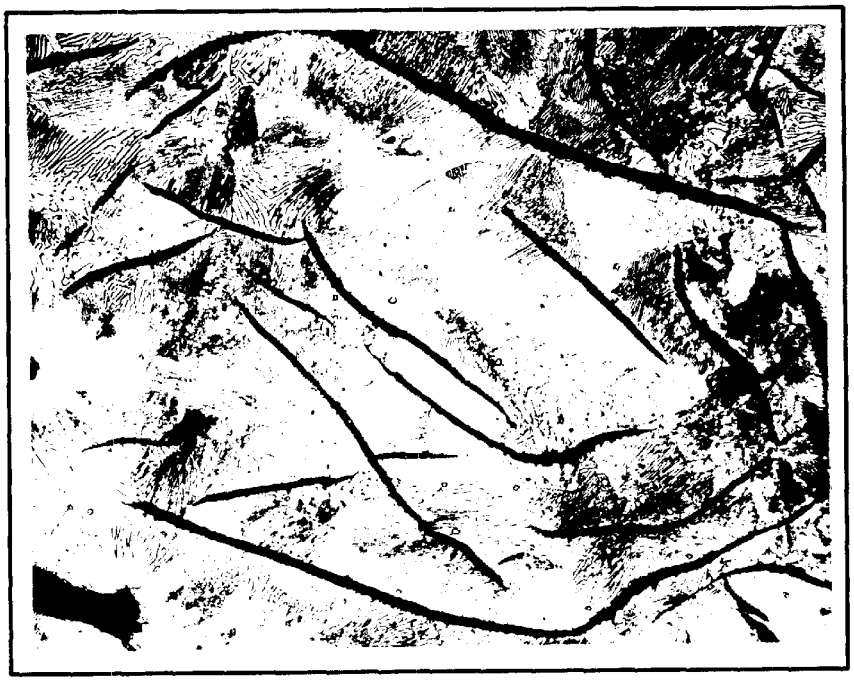
FIG. 5C is a photomicrograph depicting microstructure of a section from the same portion (at a magnification of 400×; 3% Nital etch) as FIG. 5A.
Figure 5D:
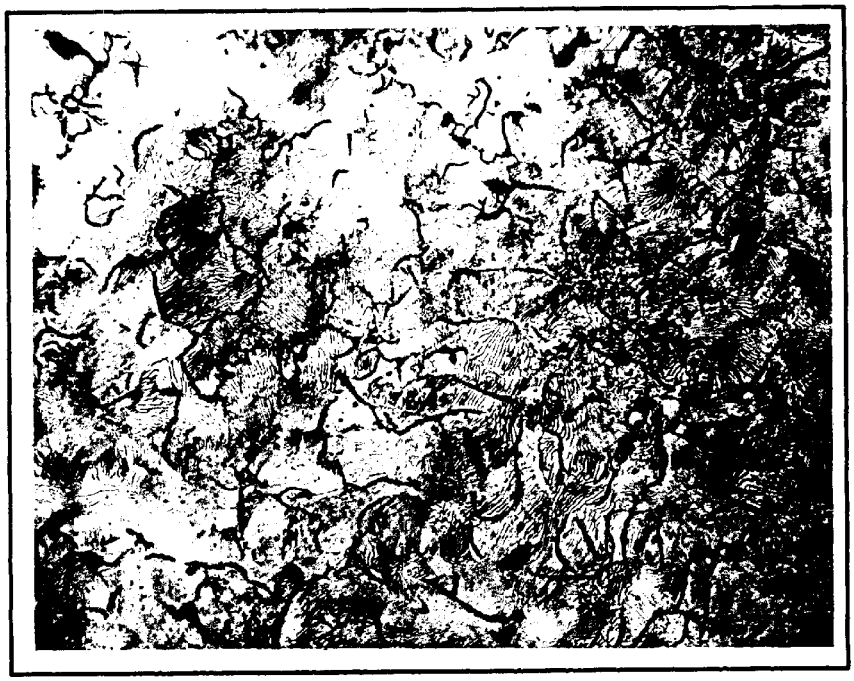
FIG. 5D is a photomicrograph depicting microstructure of a section from the same portion (at a magnification of 400×; 3% Nital etch) as FIG. 5B.

For ease of discussion, FIGS. 1–4 depict one illustrative example, without limitation, of typical scroll structures that can be employed in co-acting combination with one another. The structures shown are cast as integral structures. FIGS. 1 and 2 illustrate two perspective views of a typical scroll structure for a fixed scroll 10. The function and operation of such scroll will be appreciated and understood by the skilled artisan. The fixed scroll 10 includes a first base portion 12 having a first plate member 14, a wall 16 depending from the first plate member, and a second plate member 18. A sealing flange 20 extends away from the second plate member 18 about the periphery of the latter. A sealing collar 22 within the sealing flange 20 extends away from the second plate member 18. A first spiroidal vane member 24 extends from a surface of the second plate member 18 opposite the surface from which the sealing collar 22 originates. The vane member 24 terminates at a free end 26. Referring to FIGS. 3 and 4, there is shown an example of one type of a moveable (orbiting) scroll 28. The scroll 28 has a second base portion 30. The base portion 30 includes a third plate member 32 defining a surface from which a second spiroidal vane member 34 extends. The vane member 34 terminates at a free end 36. A hub 38 extends from a surface 40 in a direction away from the second spiroidal vane member 34.

The skilled artisan will appreciate that FIGS. 1–4 are for illustration purposes only (e.g. to demonstrate the geometric intricacies of scrolls) and are not intended as limiting. The present invention contemplates its usefulness in many different structures, other than those of FIGS. 1–4.

The system of the present invention involves employment of a process having the steps of:

(a) preparing a melt of a ferrous base material;

(b) inoculating the melt with a high performance inoculant;

(c) alloying the melt with a suitable pearlite stabilizer to achieve a predetermined microstructure in a resulting article;

(d) adjusting the temperature of the melt; and (e) pouring the melt to cast an article.

The ferrous base material preferably is of a suitable composition to result, upon casting, in a gray cast iron. Thus, the ferrous base material preferably includes iron, as a base material (i.e. greater than about 50%, and more preferably greater than about 85%, by weight of the base material) along with carbon, silicon, and manganese in predetermined amounts.

For instance, for a preferred base material, carbon is present in the base material in an amount ranging from about 2.5% to about 3.9%, by weight of the base material, and more preferably about 3.3%, by weight of the base material. Silicon is present in the base material in an amount ranging from about 1.5% to about 3%, by weight of the base material, and more preferably about 1.7%, by weight of the base material. Manganese is present in the base material in an amount ranging from about 0.3% to about 1.0%, by weight of the base material, and more preferably about 0.6%, by weight of the base material. The skilled artisan will appreciate that higher or lower contents than the above may be suitably employed. For instance, for larger castings, lower carbon or silicon levels may be employed to arrive at the desired structure.

Trace amounts of one or more impurities are acceptable in the ferrous base material. For instance, it is contemplated that impurities may be present in the amounts (expressed in percent, by weight of the base material) up to about those shown in Table 1.

TABLE 1

| Element | Approximate Maximum |
|---|---|
| Sulfur | 0.15% |
| Phosphorus | 0.07% |
| Lead | 0.003% |
| Aluminum | 0.01% |

The ferrous base material is prepared in any suitable manner. Upon preparation, it is maintained at a first temperature of at least about 2690° F. (1477° C.), in a suitable furnace, preferably a melting furnace (e.g., electric or induction melt furnace) or a holding furnace, under any suitable atmosphere. Where cupola melting is employed, suitable oxygen enrichment techniques may be employed.

After melting the ferrous base material, while still at a temperature greater than about 2690° F. (1477° C.), resulting molten metal preferably is tapped, at any suitable flow rate, into a transfer or pouring ladle suitable for the manufacture of gray cast iron. A conventional teapot ladle may be used for either such ladle. A conventional bottom tapped ladle may also be employed for pouring. As to the latter, it is preferable to employ a graphite stopper attached to a rod for moving the stopper into and out of stopping engagement with the tap hole of the ladle.

At about the time when the molten metal is being tapped into the transfer or pouring ladle, preferably such molten metal is treated with a predetermined amount of a high performance inoculant, which preferably is introduced to the molten metal via a suitable carrier (e.g. as part of a ferrosilicon base material additive). By "high performance inoculant" as used herein, it is meant one or more elements that will promote the formation of the type A graphite flakes in the cast material, while reducing the tendency to form chill (i.e., white iron or eutectic carbide ($Fe_3C$)). Without intending to be bound by theory it is believed that the high performance inoculant increases the amount and stability of nuclei (e.g., without limitation, strontium carbide, where strontium is the inoculant) present in the molten iron, to help thereby achieve the desired microstructure.

The preferred high performance inoculants employed herein include one or more elements selected from the group consisting of strontium, a lanthanide series rare earth element and mixtures thereof. More preferably the inoculant is selected from the group consisting of strontium, cerium, yttrium, scandium, neodymium, lanthanum and mixtures thereof. Still more preferably the inoculant is selected from the group consisting of strontium, cerium and mixtures thereof. Suitable high performance inoculants also may incorporate inoculants discussed in Table 5, page 637, Volume 15, Metals Handbook (9th Ed.), hereby incorporated by reference. For example, inoculants also may be added, such as barium, calcium, titanium, zirconium or mixtures thereof. A most preferred high performance inoculant is a strontium inoculant.

Preferably the amount of high-performance inoculant is sufficient to result (after any fade or lack of pickup of the inoculant in the melt) in the desired microstructure and properties as discussed herein. This ordinarily entails inoculating with a strontium inoculant whereby strontium is provided in a ferrosilicon carrier so that the concentration of strontium is about 0.6% to about 1.0% and more preferably about 0.8%, by weight of the overall high-performance inoculant and carrier combination, and silicon is present from about 73% to about 78% and more preferably about 75%, by weight of the overall high-performance inoculant and carrier combination. The high-performance inoculant and carrier combination is added to the molten ferrous base metal in an amount of about 0.4% to about 0.8%, by weight of the molten metal being inoculated. As the skilled artisan will appreciate, higher or lower amounts may be employed.

The skilled artisan will appreciate that the amounts of the high performance inoculant employed in the present invention as well as any other inoculants (as discussed herein) are not critical but are selected with reference to the desired as cast microstructure and properties. Accordingly, factors such as the anticipated fade, recovery, and other processing considerations that would effect the ability of the inoculant to function for nucleation purposes, may be taken into consideration and adjusted accordingly. Thus, the amounts recited herein are for purposes of illustration, but are not intended as limiting. Further, while the final as cast composition tends to result in a composition having in the range of about 3 to about 100 ppm of the high performance inoculant element, that concentration is not critical, provided that the microstructure as described herein is accomplished using the high-performance inoculant. Further, where the inoculant is not strontium, by itself, it may be possible that higher concentrations of the high-performance inoculant may be anticipated or expected in the final as cast composition.

The above step of inoculation may optionally be combined, either before, during or after inoculation, with an additional step of further alloying the molten metal, with one or more additional alloying elements, preferably to achieve, without limitation, pearlite stabilization in the microstructure of the cast material.

When the inoculation step is combined with a further step of alloying the molten metal, the preferred alloying elements are selected from the group consisting of copper, tin, chromium, antimony and mixtures thereof. Preferably, the alloying elements are selected and added in specific predetermined amounts to help achieve a minimum strength in the resulting as cast material of at least about 250 Mpa, and a substantially entirely pearlitic matrix microstructure throughout the material. The skilled artisan will appreciate that other suitable pearlite stabilizing agents may likewise be employed in suitable concentrations.

Suitable alloying elements may also be added in suitable amounts for purposes other than pearlite stabilization (e.g. to retard wear or to refine graphite). Examples of other possible alloying elements include elements such as nickel, molybdenum, titanium or mixtures thereof.

In a preferred embodiment, one or more of the alloying elements are employed to achieve the approximate concentrations (expressed relative to the final resulting cast composition), recited in Table 3.

TABLE 3

| Element | Preferred | More Preferred |
|---|---|---|
| Copper | about 0.20 to about 1.0% | up to about 0.90% |
| Tin | about 0.025 to about 0.20% | up to about 0.15% |
| Chromium | about 0.05 to about 0.2% | up to about 0.17% |

TABLE 3-continued

| Element | Preferred | More Preferred |
|---|---|---|
| Antimony | about 0.01 to about 0.2% | up to about 0.04% |

In yet a still more preferred embodiment, the alloying elements are employed in a combination including (expressed in terms of percent by weight of the final resulting cast composition) about 0.6% copper, about 0.12% tin, about 0.10% chromium and about 0.03% antimony. In this manner, it is believed possible to avoid potentially undesirable effects, particularly in cast scroll structures. For instance, without intending to be bound by theory, it is believed that when employed in combinations other than the present most preferred composition, and at levels higher than the disclosed ranges, for scroll castings, copper tends to refine the resulting pearlite, tin or antimony tends to embrittle the iron, and chromium tends to promote formation of undesirable amounts of eutectic carbide. Further, it is not believed possible to optimize the beneficial effects of antimony on the casting skin unless used in the present amount or in the present most preferred combination.

Of course, as the skilled artisan will appreciate, factors such as the molding method employed or the specific casting design may potentially affect the amount or type of alloying elements employed to achieve the required mechanical properties and pearlite stabilization in the resulting cast material. Thus, the above alloying elements may be adjusted upwardly or downwardly or used in different combinations to achieve a desired result. For example, antimony and tin can be used in smaller amounts than set forth in the most preferred embodiment.

After inoculation, the carbon equivalent preferably should be about 4.1%. As used herein, "carbon equivalent" refers to the sum of the carbon content plus the product of 0.33 multiplied by the silicon content. Accordingly, adjustment of the silicon or carbon levels may be made, such as by trimming carbon levels through additions of steel, by raising carbon levels through carbon raisers (e.g. containing graphite), by inoculating with silicon as hereinafter described or any other suitable way.

During the steps of inoculation and alloying element addition, in accordance with the above, the molten metal is maintained at a temperature preferably greater than about 2690° F. (1477° C.). Just prior to pouring, preferably the molten metal is adjusted downward to a pouring temperature of as low as about 2500° F. (1371° C.). By way of example, without limitation, for smaller castings (e.g. about 1 kg), the temperature is preferably brought to about 2640° F. (1449° C.). For larger castings (e.g. about 3 kg), the temperature is preferably brought to about 2510° F. (1377° C.). This may be done using any suitable technique for relatively rapidly reducing the temperature of the molten metal (e.g., to help avoid fade of the high performance inoculant and to improve production efficiency), such as conventional chill techniques, wherein scrap gray iron castings may be added to the melt. Of course, higher or lower temperatures are possible, depending upon mold shape, material, control over shrinkage and other like considerations. For instance, the pouring temperature may be as high as about 2750° F. (1510° C.), such as when the temperature during inoculation is greater than about 2750° F. (1510° C.).

Preferably, the time between inoculation with the high performance inoculant and pouring of the molten metal into a mold should not exceed the time for fade (i.e. nuclei reduction), wherein subsequent solidification would result in formation of undesirable eutectic carbide, or undercooled structures, as the high performance inoculant becomes ineffective over time for achieving ultimate desired microstructure. Preferably, the time should not exceed about 8 minutes and more preferably should not exceed about 6 minutes.

Though any suitable amounts of molten metal may be treated and transferred in the transfer ladle, preferred amounts for the manufacture of scrolls range from about 600 to about 1000 pounds.

The molten metal that is in the transfer or pouring ladle is poured into suitable molds. In a preferred embodiment, the molds are a conventional premium mold type (e.g., without limitation, shell molds, or investment casting molds), in order to minimize further post-casting finishing operations. Of course, any suitable molds may still be employed, including green sand molds.

Where further inoculation is desired for improving or modifying the graphite or matrix structure, such as coarsening the pearlite, a suitable in-mold inoculation step may be employed. By way of example, without limitation, a ceramic filter may be placed in a downsprue of a mold, and predetermined amounts of chunks, pellets, powder or other granulated form of inoculant (e.g., 75% calcium bearing ferrosilicon) may be placed on the filter. Molten metal will thus carry the inoculant material into the mold, where it will interact with the molten metal during solidification. The cast material is thereafter cooled and removed from the mold by any suitable technique.

In one embodiment, for example, molds are positioned on a mold carrier machine (e.g., a commercially available Royer mold carrier), for pouring, and are thereafter transferred via the mold carrier to a shake out drum. The time between pouring and shake out is preferably selected so that, upon air cooling, a hardness (Bhn) is achieved in the as-cast structure of about 187–241 and an average hardness differential throughout the structure of less than about 15 points. Thus for a shell-molded scroll, as described previously, the shake-out time may occur from about 45 to about 75 minutes after pouring. Higher or lower times, of course, may be employed.

The resulting cast material has a substantially homogeneous microstructure of type A graphite dispersed relatively uniformly throughout a generally pearlitic matrix. FIGS. 5A–5D illustrate the microstructure and show how the graphite (the solid darker phase) is dispersed throughout the lamellar pearlitic phase (the lighter phase). The microstructure of FIGS. 5B and 5D extends throughout substantially an entire vane member of a scroll (regardless of scroll type), including in the region substantially adjacent the free end of the vane. The microstructure of FIGS. 5A and 5C extends throughout substantially the entire base portion of such scroll.

A comparison between the microstructures of the vane and the generally thicker base portion structure suggests that where a section of the scroll casting is generally thinner in section than another section of the casting, the corresponding graphite flake size microstructure is relatively more fine, with a substantially uniform coarseness of pearlite throughout both sections. The microstructure of FIGS. 5A–5D is further characterized by regions that are substantially free of ferrite, steadite (though it may be included in other embodiments as desired), eutectic carbide, fine pearlite (e.g. that which cannot be resolved optically at 400× magnification in an etched state), abnormal graphite structure (e.g. Types C, D or E) and porosity or other voids. The resulting product has a tensile strength of at least about 250 MPa. As-cast section thicknesses having the above microstructure can be achieved to as low as about 4 millimeters, and can also be achieved in larger thickness sections (e.g., without limitation greater than about 30 mm). Further, post-casting finishing is minimized by reducing necessary finish stock to about 1.5 millimeters, and more preferably about 1 millimeter or less.

In a highly preferred embodiment, where the high performance inoculant is strontium, the final composition of the as-cast material includes about 3.0 to about 3.9% carbon, and more preferably about 3.42% carbon; about 1.5 to about 3.2% silicon, and more preferably about 2.38% silicon; about 0.2 to about 1.25% manganese, and more preferably about 0.62% manganese; about 0.2 to about 1.0% copper, and more preferably up to about 0.60% copper; about 0.025 to about 0.20% tin, and more preferably about 0.12% tin; about 0.05 to about 0.2% chromium, and more preferably about 0.10% chromium; about 0.01 to about 0.2% antimony, and more preferably about 0.03% antimony; up to about 0.08% sulfur; up to about 0.05% phosphorus; up to about 0.01 and more preferably up to about 0.015% titanium, and about 3 to about 100 ppm strontium and more preferably about 6 to about 70 ppm strontium. Where other high-performance inoculants are used, rather than just strontium, a preferred composition is the same as the above, substituting the high-performance inoculant for strontium in approximately the same or a greater amount. For example, if cerium or another rare earth element (either with or without cerium) is employed as a high performance inoculant, it may be added and could result in a concentration up to about ten times greater than the preferred concentration for strontium discussed herein.

While the above detailed description describes the preferred embodiment of the present invention, it should be understood that the present invention is susceptible to modification, variation and alteration without deviating from the scope and fair meaning of the subjoined claims.

What is claimed is:

1. A gray cast iron scroll for use in a scroll machine, comprising:

a) a base portion; and b) a vane portion adjoining said base portion;

said base portion and said vane portion being composed of a material comprising:

i) carbon;

ii) silicon;

iii) manganese;

iv) a high performance inoculant including strontium present in an amount of about 3 to about 100 ppm; and v) the balance iron;

said base portion and said vane portion having a microstructure of type A graphite [and], a pearlite matrix, *and regions that are substantially free of steadite that can be resolved optically at 400 times magnification in an etched state,* throughout substantially their entire structure; and said base portion and said vane portion being capable of exhibiting said microstructure substantially throughout said scroll.

2. A gray cast iron scroll according to claim 1 wherein said high-performance inoculant further comprises a lanthanide series rare earth element.

3. A gray cast iron scroll according to claim 1 wherein said high-performance inoculant is strontium in an amount of about 3 to about 100 ppm.

4. A gray cast iron scroll according to claim 1 wherein said microstructure is substantially free of steadite.

5. A gray cast iron scroll according to claim 1 wherein said microstructure is substantially free of type C, type D and type E graphite.

6. A gray cast iron scroll according to claim 1 wherein the required finished stock on said scroll is less than about 1 millimeter.

7. A scroll machine, comprising:

a) a first scroll; and b) a second scroll in coacting combination with said first scroll, at least one of said scrolls:

i) being composed of a gray cast iron having a high performance inoculant present in an amount of about 3 to about 100 ppm; and ii) having a microstructure of type A graphite [and], a pearlite matrix, *and regions that are substantially free of steadite that can be resolved optically at 400 times magnification in an etched state.*

8. A scroll machine according to claim 7, wherein said high performance inoculant is selected from strontium, a lanthanide series rare earth element or mixtures thereof.

9. A scroll machine according to claim 7, wherein said high performance inoculant is selected from strontium, cerium, yttrium, scandium, neodymium, lanthanum, or mixtures thereof.

10. A scroll machine according to claim 7, wherein said high performance inoculant is strontium.

11. A scroll machine according to claim 7, wherein said high performance inoculant is strontium in an amount of about 6 to about 70 ppm.

12. A scroll machine according to claim 7, wherein said high performance inoculant is cerium.

13. A scroll machine according to claim 7, wherein said high performance inoculant is yttrium.

14. A scroll machine according to claim 7, wherein said high performance inoculant is scandium.

15. A scroll machine according to claim 7, wherein said high performance inoculant is neodymium.

16. A scroll machine according to claim 7, wherein said high performance inoculant is lanthanum.

17. A scroll machine according to claim 7, wherein said high performance inoculant includes an element selected from barium, calcium, titanium, zirconium, or mixtures thereof.

18. A scroll machine according to claim 7, wherein said scroll machine is a scroll compressor.

19. A scroll machine, comprising:

a) a first scroll; and b) a second scroll in coacting combination with said first scroll, at least one of said scrolls;

i) being composed of a gray cast iron;

ii) having a high performance inoculant present in an amount of about 3 to about 100 ppm;

iii) having a microstructure of type A graphite [and], a pearlite matrix, *and regions that are substantially free of steadite that can be resolved optically at 400 times magnification in an etched state*; and iv) having a tensile strength of about 250 MPa.

20. A scroll machine according to claim 19, wherein said high performance inoculant is selected from strontium, a lanthanide series rare earth element or mixtures thereof.

21. A scroll machine according to claim 19, wherein said high performance inoculant is selected from strontium, cerium, yttrium, scandium, neodymium, lanthanum, or mixtures thereof.

22. A scroll machine according to claim 19, wherein said high performance inoculant is strontium.

23. A scroll machine according to claim 19, wherein said high performance inoculant is strontium in an amount of about 6 to about 70 ppm.

24. A scroll machine according to claim 19, wherein said high performance inoculant is cerium.

25. A scroll machine according to claim 19, wherein said high performance inoculant is yttrium.

26. A scroll machine according to claim 19, wherein said high performance inoculant is scandium.

27. A scroll machine according to claim 19, wherein said high performance inoculant is neodymium.

28. A scroll machine according to claim 19, wherein said high performance inoculant is lanthanum.

29. A scroll machine according to claim 19, wherein said high performance inoculant includes an element selected from barium, calcium, titanium, zirconium, or mixtures thereof.

30. A scroll machine according to claim 19, wherein said at least one of said fixed scroll and said orbiting scroll has a hardness (Bhn) of about 187 to about 241.

31. A scroll machine according to claim 30, wherein said at least one of said fixed scroll and said orbiting scroll has an average hardness differential of no greater than about 15 points (Bhn) throughout said scroll.

32. A scroll machine according to claim 19, wherein said scroll machine is a scroll compressor.

33. A scroll, comprising:

a) a base portion; and b) a vane portion adjoining said base portion; said vane portion and said base portion:

i) being composed of a cast iron;

ii) having a high performance inoculant present in an amount of about 3 to about 100 ppm;

iii) having a microstructure of graphite, a pearlite matrix and regions that are substantially free of ferrite, steadite, eutectic carbide, [pearlite] that [cannot] *can* be resolved optically at 400× magnification in an etched state, type C graphite, type D graphite, type E graphite and porosity; and iv) having a tensile strength of at least about 250 MPa.

34. A scroll according to claim 33, wherein said high performance inoculant is selected from strontium, a lanthanide series rare earth element or mixtures thereof.

35. A scroll according to claim 33, wherein said high performance inoculant is selected from strontium, cerium, yttrium, scandium, neodymium, lanthanum, or mixtures thereof.

36. A scroll according to claim 33, wherein said high performance inoculant is strontium.

37. A scroll according to claim 33, wherein said high performance inoculant is strontium in an amount of about 6 to about 70 ppm.

38. A scroll according to claim 33, wherein said high performance inoculant is cerium.

39. A scroll according to claim 33, wherein said high performance inoculant is yttrium.

40. A scroll according to claim 33, wherein said high performance inoculant is scandium.

41. A scroll according to claim 33, wherein said high performance inoculant is neodymium.

42. A scroll according to claim 33, wherein said high performance inoculant is lanthanum.

43. A scroll according to claim 33, wherein said high performance inoculant includes an element selected from barium, calcium, titanium, zirconium, or mixtures thereof.

44. A scroll machine, comprising:

a) a first scroll; and b) a second scroll in coacting combination with said first scroll;

at least one of said scrolls having a microstructure of graphite and a pearlite matrix *substantially free of*

*steadite that can be resolved optically at 400 times magnification in an etched state,* throughout substantially its entire structure, and being composed of a material having a final composition comprising:

i) carbon in an amount of about 3.0 to about 3.9% by weight;

ii) silicon in an amount of about 1.5 to about 3.2% by weight;

iii) manganese in an amount of about 0.2 to about 1.25% by weight;

iv) a high performance inoculant present in an amount of about 3 to about 100 ppm; and v) the balance iron.

45. A scroll machine according to claim 44, wherein said high performance inoculant is selected from strontium, a lanthanide series rare earth element or mixtures thereof.

46. A scroll machine according to claim 44, wherein said high performance inoculant is selected from strontium, cerium, yttrium, scandium, neodymium, lanthanum, or mixtures thereof.

47. A scroll machine according to claim 44, wherein said high performance inoculant is strontium.

48. A scroll machine according to claim 44, wherein said high performance inoculant is strontium in an amount of about 6 to about 70 ppm.

49. A scroll machine according to claim 44, wherein said high performance inoculant is cerium.

50. A scroll machine according to claim 44, wherein said high performance inoculant is yttrium.

51. A scroll machine according to claim 44, wherein said high performance inoculant is scandium.

52. A scroll machine according to claim 44, wherein said high performance inoculant is neodymium.

53. A scroll machine according to claim 44, wherein said high performance inoculant is lanthanum.

54. A scroll machine according to claim 44, wherein said high performance inoculant includes an element selected from barium, calcium, titanium, zirconium, or mixtures thereof.

55. A scroll machine according to claim 44, wherein said scroll machine is a scroll compressor.

56. A scroll machine, comprising:

a) a first scroll; and b) a second scroll in coacting combination with said first scroll, at least one of said scrolls:

i) being composed of a gray cast iron having a high performance inoculant present in an amount of about 3 to about 100 ppm;

ii) having a microstructure of graphite [and], a pearlite matrix*, and regions that are substantially free of steadite that can be resolved optically at 400 times magnification in an etched state*; and iii) having possessed a finish stock of less than about 1 millimeter.

57. A scroll machine according to claim 56, wherein said high performance inoculant is selected from strontium, a lanthanide series rare earth element or mixtures thereof.

58. A scroll machine according to claim 56, wherein said high performance inoculant is selected from strontium, cerium, yttrium, scandium, neodymium, lanthanum, or mixtures thereof.

59. A scroll machine according to claim 56, wherein said high performance inoculant is strontium.

60. A scroll machine according to claim 56, wherein said high performance inoculant is strontium in an amount of about 6 to about 70 ppm.

61. A scroll machine according to claim 56, wherein said high performance inoculant is cerium.

62. A scroll machine according to claim 56, wherein said high performance inoculant is yttrium.

63. A scroll machine according to claim 56, wherein said high performance inoculant is scandium.

64. A scroll machine according to claim 56, wherein said high performance inoculant is neodymium.

65. A scroll machine according to claim 56, wherein said high performance inoculant is lanthanum.

66. A scroll machine according to claim 56, wherein said high performance inoculant includes an element selected from barium, calcium, titanium, zirconium, or mixtures thereof.

67. A scroll machine according to claim 56, wherein said scroll machine is a scroll compressor.

68. A scroll machine, comprising:

a scroll having a base portion; and a vane portion adjoining said base portion;

said base portion and said vane portion being composed of a material comprising:

i) carbon;

ii) silicon;

iii) manganese;

iv) a high performance inoculant present in an amount of about 3 to about 100 ppm; and v) the balance iron;

said base portion and said vane portion including a microstructure of graphite and a pearlite matrix *substantially free of steadite that can be resolved optically at 400 times magnification in an etched state*.

69. A scroll machine according to claim 68, wherein said high performance inoculant is selected from strontium, a lanthanide series rare earth element or mixtures thereof.

70. A scroll machine according to claim 68, wherein said high performance inoculant is selected from strontium, cerium, yttrium, scandium, neodymium, lanthanum, or mixtures thereof.

71. A scroll machine according to claim 68, wherein said high performance inoculant is strontium.

72. A scroll machine according to claim 68, wherein said high performance inoculant is strontium in an amount of about 6 to about 70 ppm.

73. A scroll machine according to claim 68, wherein said high performance inoculant is cerium.

74. A scroll machine according to claim 68, wherein said high performance inoculant is yttrium.

75. A scroll machine according to claim 68, wherein said high performance inoculant is scandium.

76. A scroll machine according to claim 68, wherein said high performance inoculant is neodymium.

77. A scroll machine according to claim 68, wherein said high performance inoculant is lanthanum.

78. A scroll machine according to claim 68, wherein said high performance inoculant includes an element selected from barium, calcium, titanium, zirconium, or mixtures thereof.

79. A scroll machine according to claim 68, wherein said scroll machine is a scroll compressor.

*80. A gray cast iron scroll for use in a scroll machine, comprising:*

*a) a base portion; and*

*b) a vane portion adjoining said base portion; said base portion and said vane portion being composed of a material comprising:*

*i) carbon;*

*ii) silicon;*

*iii) manganese;*

*iv) a high performance inoculant including strontium present in an amount of about 3 to about 100 ppm;*

*v) the balance iron;*

*said base portion and said vane portion having a microstructure of type A graphite, a pearlite matrix, and regions that are substantially free of steadite that can be resolved optically at 400 times magnification in an etched state throughout substantially their entire structure;*

*said base portion and said vane portion being capable of exhibiting said microstructure substantially throughout said scroll; and*

*wherein said high performance inoculant is effective to promote the formation of the type A graphite and pearlite matrix.*

*81. A gray cast iron scroll according to claim 80 wherein said high performance inoculant further comprises a lanthanide series rare earth element.*

*82. A gray cast iron scroll according to claim 80 wherein said microstructure is substantially free of steadite.*

*83. A gray cast iron scroll according to claim 80 wherein the said microstructure is substantially free of type C, type D and type E graphite.*

*84. A gray cast iron scroll according to claim 80 wherein the required finished stock on said scroll is less than 1.5 millimeter.*

*85. A scroll machine, comprising:*

*a) a first scroll;*

*b) a second scroll in coacting combination with said first scroll, at least one of said scrolls:*

*i) being composed of a gray cast iron having a high performance inoculant present in an amount of about 3 to about 100 ppm; and*

*ii) having a microstructure of type A graphite, a pearlite matrix, and regions that are substantially free of steadite that can be resolved optically at 400 times magnification in an etched state and wherein said high performance inoculant is effective to promote the formation of the type A graphite and pearlite matrix.*

*86. A scroll machine according to claim 85, wherein said high performance inoculant is selected from strontium, cerium, yttrium, scandium, neodymium, lanthanum, or mixtures thereof.*

*87. A scroll machine according to claim 85, wherein said high performance inoculant is barium.*

*88. A scroll machine according to claim 85, wherein said high performance inoculant is strontium in an amount of about 6 to about 70 ppm.*

*89. A scroll machine according to claim 85, wherein said high performance inoculant is calcium.*

*90. A scroll machine according to claim 85, wherein said high performance inoculant is titanium.*

*91. A scroll machine according to claim 85, wherein said high performance inoculant is zirconium.*

*92. A scroll machine according to claim 7, wherein said high performance inoculant is barium.*

*93. A scroll machine according to claim 7, wherein said high performance inoculant is calcium.*

*94. A scroll machine according to claim 7, wherein said high performance inoculant is titanium.*

*95. A scroll machine according to claim 7, wherein said high performance inoculant is zirconium.*

*96. A gray cast iron scroll according to claim 1 wherein the required finished stock on said scroll is less than 1.5 millimeters.*

*97. A gray cast iron scroll for use in a scroll machine comprising:*

*a high performance inoculant present in an amount of about 6 to about 70 ppm; and*

*having a microstructure of type A graphite and a pearlite matrix and substantially free of steadite that can be resolved optically at 400 times magnification in an etched state wherein said high performance inoculant is effective to promote the formation of the type A graphite and pearlite matrix.*

*98. A gray cast iron scroll according to claim 97, wherein said high performance inoculant is selected from strontium, cerium, yttrium, scandium, neodymium, lanthanum, or mixtures thereof.*

*99. A gray cast iron scroll according to claim 97, wherein said high performance inoculant is barium.*

*100. A gray cast iron scroll according to claim 97, wherein said high performance inoculant is calcium.*

*101. A gray cast iron scroll according to claim 97, wherein said high performance inoculant is titanium.*

*102. A gray cast iron scroll according to claim 97, wherein said high performance inoculant is zirconium.*

*103. A gray cast iron scroll according to claim 97 wherein the required finished stock on said scroll is less than 1.5 millimeters.*

* * * * *